United States Patent
Yokoyama et al.

(10) Patent No.: US 12,450,310 B2
(45) Date of Patent: Oct. 21, 2025

(54) PARAMETER ESTIMATION DEVICE, METHOD AND PROGRAM

(71) Applicant: NTT, Inc., Tokyo (JP)

(72) Inventors: Noriko Yokoyama, Tokyo (JP);
Masahiro Kojima, Tokyo (JP);
Tatsushi Matsubayashi, Tokyo (JP);
Hiroyuki Toda, Tokyo (JP)

(73) Assignee: NTT, Inc., Tokyo (JP)

( * ) Notice: Subject to any disclaimer, the term of this patent is extended or adjusted under 35 U.S.C. 154(b) by 995 days.

(21) Appl. No.: 17/436,593

(22) PCT Filed: Feb. 27, 2020

(86) PCT No.: PCT/JP2020/008074
§ 371 (c)(1),
(2) Date: Sep. 4, 2021

(87) PCT Pub. No.: WO2020/179627
PCT Pub. Date: Sep. 10, 2020

(65) Prior Publication Data
US 2022/0171990 A1 Jun. 2, 2022

(30) Foreign Application Priority Data
Mar. 5, 2019 (JP) .................. 2019-039694

(51) Int. Cl.
*G06F 18/2132* (2023.01)
*G06F 18/2135* (2023.01)
*G06F 30/20* (2020.01)
*G06N 7/01* (2023.01)
*G06F 111/06* (2020.01)

(52) U.S. Cl.
CPC .... *G06F 18/21322* (2023.01); *G06F 18/2135* (2023.01); *G06F 30/20* (2020.01); *G06N 7/01* (2023.01); *G06F 18/21326* (2023.01); *G06F 2111/06* (2020.01)

(58) Field of Classification Search
CPC .......... G06F 18/21322; G06F 18/2135; G06F 30/20; G06F 18/21326; G06F 2111/06; G06N 7/01; G06N 5/01
See application file for complete search history.

(56) References Cited

PUBLICATIONS

Hoang TN, Hoang QM, Ouyang R, Low KH. Decentralized high-dimensional Bayesian optimization with factor graphs. In Proceedings of the AAAI Conference on Artificial Intelligence Apr. 29, 2018 (vol. 32, No. 1). (Year: 2018).*
Hoang TN, Hoang QM, Low BK. A distributed variational inference framework for unifying parallel sparse Gaussian process regression models. In International Conference on Machine Learning Jun. 11, 2016 (pp. 382-391). PMLR. (Year: 2016).*

(Continued)

*Primary Examiner* — Chuen-Meei Gan (57) ABSTRACT

The present invention relates to a parameter estimation system, a parameter estimation method, and a program, and more particularly to a parameter estimation system, a parameter estimation method, and a program that efficiently estimate parameters of machine learning and simulation, etc. An objective of the present invention is to provide a parameter estimation system and a parameter estimation method that may rapidly determine the optimum input parameter.

20 Claims, 9 Drawing Sheets

(56) References Cited

PUBLICATIONS

Qian H, Yu Y. Scaling simultaneous optimistic optimization for high-dimensional non-convex functions with low effective dimensions. In Proceedings of the AAAI Conference on Artificial Intelligence Mar. 2, 2016 (vol. 30, No. 1). (Year: 2016).*

Snoek et al. (2012) "Practical Bayesian Optimization of Machine Learning Algorithms" In Advances in Neural Information Processing Systems (NIPS).

Kandasamy et al. (2018) "Parallelised Bayesian Optimisation via Thompson Sampling" Proceedings of the 21stInternational Conference on Artificial Intelligence and Statistics (AISTATS), vol. 84.

Wang et al. (2016) "Bayesian Optimization in a Billion Dimensions via Random Embeddings" Journal of Artificial Intelligence Research, vol. 55, pp. 361-387.

Wang et al. (2018) "Batched Large-scale Bayesian Optimization in High-dimensional Spaces" Proceedings of the 21st International Conference on Artificial Intelligence and Statistics (AISTATS), vol. 84.

* cited by examiner

PARAMETER ESTIMATION DEVICE, METHOD AND PROGRAM

CROSS-REFERENCE TO RELATED APPLICATIONS

This application is a U.S. 371 Application of International Patent Application No. PCT/JP2020/008074, filed on 27 Feb. 2020, which application claims priority to and the benefit of JP Application No. 2019-039694, filed on 5 Mar. 2019, the disclosures of which are hereby incorporated herein by reference in their entireties.

TECHNICAL FIELD

The present invention relates to a parameter estimation system, a parameter estimation method, and a program, and more particularly to a parameter estimation system, a parameter estimation method, and a program that efficiently estimate parameters of machine learning and simulation, etc.

BACKGROUND ART

With the spread of IoT, it has become possible to collect information on many people and things. The movement to utilize the acquired information in tourism, transportation, medical fields, etc. has been activated. Technologies such as machine learning and simulation are used as data analysis techniques. Searching for the optimum parameters for these often requires enormous computational costs. Then, there is Bayesian optimization as a technique for efficient parameter search (NPL 1).

Bayesian optimization is a technique of determining the optimum value (maximum value or minimum value) of a black box function on the basis of the posterior distribution of the function obtained from observation information. It is known that Bayesian optimization determines parameters to be observed on the basis of the probability distribution and may determine the optimum value more efficiently than the random search or the like that randomly selects parameters. However, even with Bayesian optimization, there is still the problem of computational cost, especially for high dimensional parameters or a large range of possible values. For example, if one search takes seven minutes, 100 trials will take 10 hours or more.

Asynchronous parallelization of processing can be considered as a technique of speeding up in Bayesian optimization. For example, as a technique of processing Bayesian optimization in parallel, there is research in which tasks are thrown to M workers and Bayesian optimization is executed in parallel (NPL 2). For example, if 100 searches are parallelized with M=4 workers, about four times faster speed can be expected. This research is also characterized by asynchronous parallel processing that can reduce the waiting time of other workers. Asynchronous parallel processing is parallel processing that allows each worker to start a search without waiting for the other workers to finish searching.

There is also a technique for reducing the dimension of Bayesian optimization. For example, as a response to higher dimensions, there is a technique of optimizing by reducing the parameter space to a lower dimension (NPL 3). The technique of NPL 3 can be expected to determine the optimum solution with a small number of observation points (search number) by reducing the dimension.

There is also a technique of partitioning space in Bayesian optimization. For example, as a response to high-dimension and large-scale search sections, there is a technique of dividing the parameter space and optimizing each. It can be expected that by narrowing the search space, the search can be performed efficiently and the optimum solution will be found quickly.

CITATION LIST

Non Patent Literature

[NPL 1] J. Snoek, H. Larochelle, R. P. Adams. Practical Bayesian optimization of machine learning algorithms. In Advances in Neural Information Processing Systems (NIPS), 2012.

[NPL 2] K. Kandasamy, A. Krishnamurthy, J. Schneider, B. Poczos. Parallelised Bayesian Optimisation via Thompson Sampling. In Proceedings of the Twenty-First International Conference on Artificial Intelligence and Statistics (AISTATS), 2018.

[NPL 3] Z. Wang, F. Hutter, M. Zoghi, D. Matheson, N de Freitas. Bayesian Optimization in a Billion Dimensions via Random Embeddings. In Journal of Artificial Intelligence Research (JAIR), 2016.

[NPL 4] Z. Wang, C. Gehring, P. Kohli, S. Jegelka. Batched large-scale bayesian optimization in high-dimensional spaces. In Proceedings of the Twenty-First International Conference on Artificial Intelligence and Statistics (AISTATS), 2018.

SUMMARY OF THE INVENTION

Technical Problem

By using the above knowledge, it is expected that the parameter search will be faster. However, in the parallelization method of NPL 2, there is a problem that since the past search information utilized by each worker is shared among the workers and so when parallelized by M workers, search information up to M−1 sets is not available during the search. Further, in the method of NPL 3, the computation is performed only by reducing the dimension and not performing the parallelization. In addition, when reducing the dimension number, the dimension number needs to be equal to or greater than the effective dimension number, deffective, that affects the objective function. Further, in the method of NPL 4, there is a problem that if the process of dividing the parameter space needs to be done every cycle and moderate time is required for optimization, the time required for division becomes relatively large.

The present invention was accomplished in light of the above mentioned circumstances. An object of the present invention is to provide a parameter estimation system, a parameter estimation method, and a program that may rapidly determine the optimum input parameter.

Solution to Problem

To achieve the above purposes, a parameter estimation system according to the present invention is configured to comprise: a searching range determination unit that determines, according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number, and thus determines as many searching ranges as the parallel number; an optimization performing unit that repeats a predetermined number of times, for the as many searching ranges as the parallel number, in the searching range, inputting a parameter selected from the searching range and input data obtained from the transformation matrix to a predetermined device that outputs an objective function value about a previously provided observation, and acquiring an objective function value, and repeats in parallel, a predetermined number of times, determining an objective function value obtained from the parameter and the transformation matrix that provide the optimum objective function value; and an optimum value determination unit that on the basis of the objective function values determined for the respective searching ranges, determines an optimum input parameter obtained from the parameter and the transformation matrix that provide the optimum objective function value.

A parameter estimation method according to the present invention comprises the steps of: determining, by a searching range determination unit, according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number, and thus determining as many searching ranges as the parallel number; repeating a predetermined number of times, by an optimization performing unit, for the as many searching ranges as the parallel number, in the searching range, inputting a parameter selected from the searching range and input data obtained from the transformation matrix to a predetermined device that outputs an objective function value about a previously provided observation, and acquiring an objective function value, and repeating in parallel, a predetermined number of times, determining an objective function value obtained from the parameter and the transformation matrix that provide the optimum objective function value; and determining, by an optimum value determination unit, on the basis of the objective function values determined for the respective searching ranges, an optimum input parameter obtained from the parameter and the transformation matrix that provide the optimum objective function value.

A program according to the present invention is to cause a computer to execute: determining, according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number, and thus determine as many searching ranges as the parallel number; repeating a predetermined number of times, for the as many searching ranges as the parallel number, in the searching range, inputting a parameter selected from the searching range and input data obtained from the transformation matrix to a predetermined device that outputs an objective function value about a previously provided observation, and acquiring an objective function value, and repeating in parallel, a predetermined number of times, determining an objective function value obtained from the parameter and the transformation matrix that provide the optimum objective function value; and determining, on the basis of the objective function values determined for the respective searching ranges, an optimum input parameter obtained from the parameter and the transformation matrix that provide the optimum objective function value.

Advantageous Effects of Invention

A parameter estimation system, a parameter estimation method, and a program according the present invention may provide the effect of ability of rapidly determining the optimum input parameter.

DESCRIPTION OF EMBODIMENTS

Referring now to the drawings, an embodiment of the present invention will be described in more detail.

For the above problem, the embodiment of the present invention may speed up the estimation using the asynchronous parallel processing in the parallel processing processed by a plurality of workers.

In the parameter search using Bayesian optimization, the searching range for the input parameters is divided by reducing the dimension of the input parameters and the divided searching ranges are allocated to the respective workers to perform the asynchronous parallel processing.

In addition, a plurality of cycles of optimization may be performed and, in that case, the searching range including the optimum value computed in the previous cycle may be preferentially allocated.

A purpose of the embodiment of the present invention is to perform, in Bayesian optimization using the asynchronous parallel processing, processing that excludes unavailable observation information and speed up in a way that needs no additional computation cost. Additionally, another purpose is to enable processing at a lower dimension number than the conventional techniques if the dimension reduction is used as the speeding up technique.

If Bayesian optimization is speeded up, it is possible to make faster decision or the like using the estimation results in the fields of tourism, transportation, or medical care, etc.

[Precondition]

Here, the precondition for the embodiment of the present invention will be described. This embodiment will be described with respect to, as an example, a problem of estimating an input parameter x for reproducing a people flow simulation close to the actual people flow according to the number y of passers-by observed in a local place.

In this problem, input parameters x and G are defined as follows.

x: D dimension vector with the number of agents passing respective routes $R_j$ as its elements G: the difference between output data $y_{sim}$ of the simulation with x as an input and the actual observation $y_{obs}$ From the above definition, this problem can be considered as an optimization problem for determining x of formula (1) below.

[Formula 1]

$$x^* = \underset{x}{\operatorname{argmin}} G(x) \quad (1)$$

Additionally, as an example of the searching range division, as many searching ranges as the parallel number are prepared, with each searching range being defined by input parameters with a reduced dimension, and the asynchronous parallel processing are performed. If the input space x has a search dimension that does not affect G(x) or sets of x that have a linear relationship with each other, there are A and w that provide G(x)=G(Aw) using a transformation matrix A. The transformation matrix A is a transformation matrix for transforming to a space defined by a reduced dimension number d. The w is a parameter selected from the searching range. If there are A and w, the optimization problem of formula (1) can be considered by transforming to the optimization problem in an even lower dimension space. According to NPL 3, given an observed data dimension number D, a reduced dimension number d (d>effective dimension number $d_{effective}$), $x \in R^D$, and $A \in R^{D \times d}$, there is $w \in R^d$ that provides G(x)=G(Aw). In other words, for $x \in R^D$, there is $w^* \in R^d$ that provides G(x*)=G(Aw*). Therefore, given L(w)=G(Aw), this problem can be considered as an optimization problem of formula (2) below for determining w* in a lower dimension space.

[Formula 2]

$$w^* = \underset{w}{\operatorname{argmin}} L(w) \quad (2)$$

Note, however, that in the embodiment of the present invention, the optimum solution may be searched without limiting the reduced dimension number d to equal to or greater than an effective dimension number and with an arbitrary integer of 1≤d<D being selected as the reduced dimension number d. Note that L(w) will represent an objective function or an objective function value below.

Although this embodiment will be described with respect to an example of estimating an input parameter for reproducing a people flow simulation close to the actual people flow according to the number of passers-by observed in a local place as described above, this embodiment may also be applied to other data and cases for estimating parameters of machine learning and simulation. In addition, a technique for reducing the dimension other than that in NPL 3 may also be used. In addition, although an example of the parallel number=2 is used in the description, any parallel number may be set depending on the computation environment, etc. Additionally, although this embodiment will be described with respect to an example in which the dimension of the input parameter is reduced more than once as means for dividing the searching range and the parallel processing is performed, a way that divides a space into a plurality of subspaces and performs the parallel processing on the subspaces may also be used.

Under the above precondition, the configuration and acts of the embodiment of the present invention will be described in more detail below.

<Configuration of Parameter Estimation System According to Embodiment of Present Invention>

The configuration of a parameter estimation system according to the embodiment of the present invention will now be described.

Figure 1:
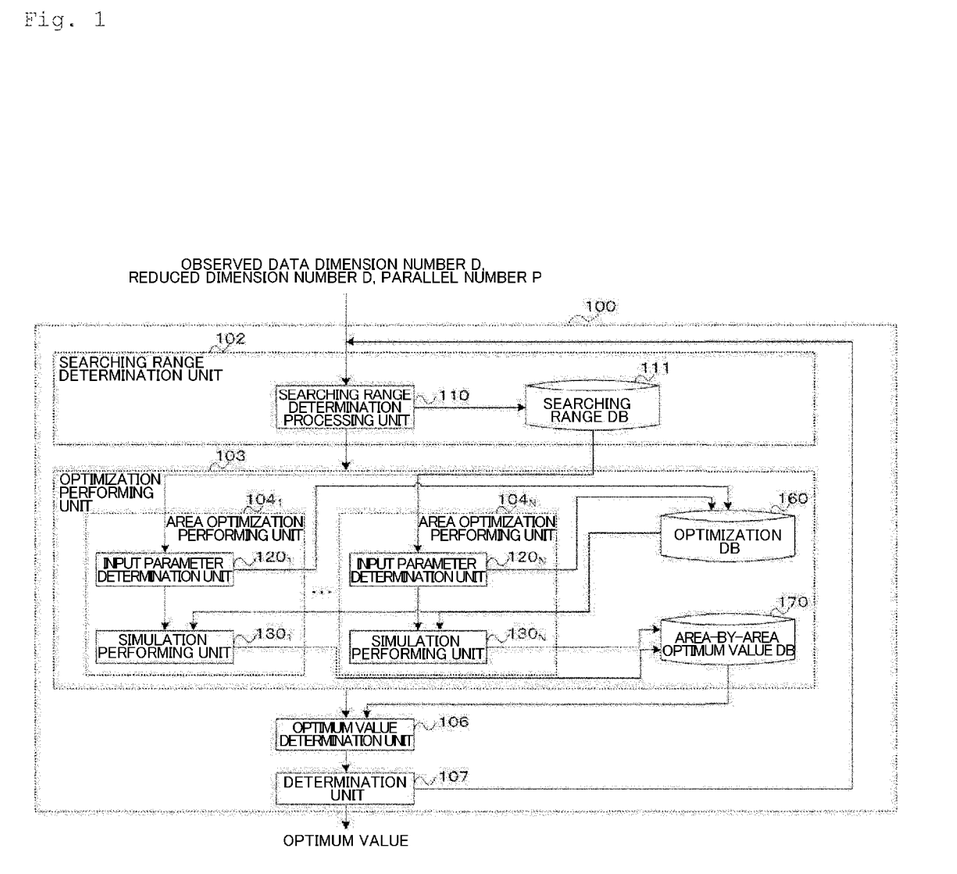
FIG. 1 is a block diagram illustrating an example configuration of a parameter estimation system according to this embodiment.

FIG. 1 is a block diagram illustrating an example configuration of a parameter estimation system 100 of this embodiment. The parameter estimation system 100 of the configuration shown in FIG. 1 may include a computer, the computer including a CPU, a RAM, and a ROM that stores a program and various data for performing the processing routines described below.

Figure 2:
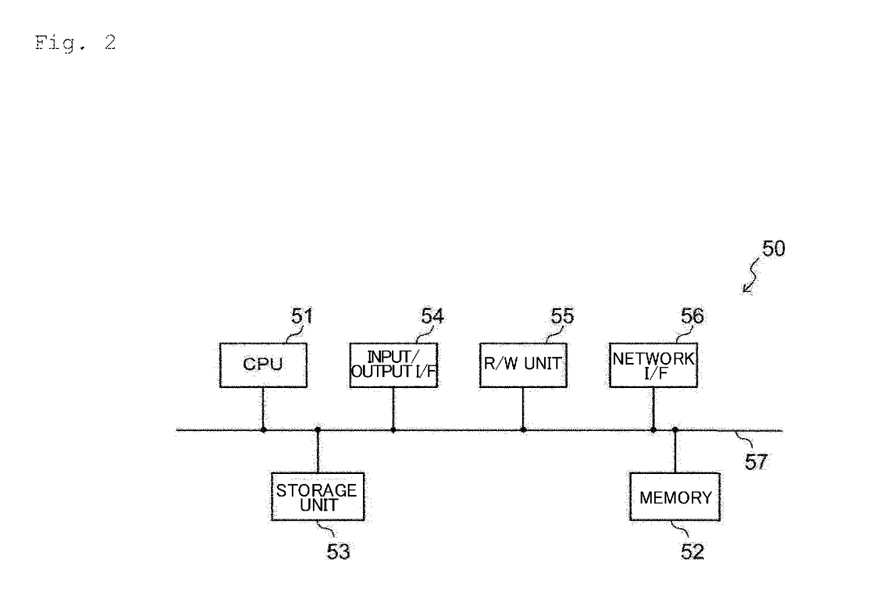
FIG. 2 is a schematic block diagram illustrating an example computer that functions as the parameter estimation system.

FIG. 2 is a schematic block diagram illustrating an example computer that functions as the parameter estimation system 100. For example, the parameter estimation system 100 may be provided by a computer 50 shown in FIG. 2. The computer 50 includes a CPU 51, a memory 52 as a temporary storage area, and a non-volatile storage unit 53. In addition, the computer 50 includes an input/output interface (I/F) 54 that has an input/output device, etc. (not shown) connected thereto, and a read/write (R/W) unit 55 for controlling reading and writing of data to a recording medium. In addition, the computer 50 includes a network I/F 56 connected to a network such as the Internet. The CPU 51, memory 52, storage unit 53, input/output I/F 54, R/W unit 55, and network I/F 56 are connected to each other via a bus 57.

The storage unit 53 may be provided by a hard disk drive (HDD), a solid state drive (SSD), and a flash memory, etc. The storage unit 53 as a storage medium stores a program for allowing the computer 50 to function. The CPU 51 reads a program from the storage unit 53, expands it in the memory 52, and performs processes of the program sequentially.

The parameter estimation system 100 includes, from a functional point of view, a searching range determination unit 102, an optimization performing unit 103, an optimum value determination unit 106, and a determination unit 107, as shown in FIG. 1.

The searching range determination unit 102 includes a searching range determination processing unit 110 and a searching range DB 111.

The searching range determination unit 102 determines, according to an input data dimension number D that is a dimension number of input data, a reduced dimension number d lower than the input data dimension number, and a parallel number P, as many transformation matrices as the parallel number P, and thus determines as many searching ranges as the parallel number P. Here, the transformation matrix is a transformation matrix for transforming a space defined by the input data dimension number to a space defined by the reduced dimension number d.

The optimization performing unit 103 includes area optimization performing units $104_1$ to $104_N$, an optimization DB 160, and an area-by-area optimum value DB 170.

The optimization performing unit 103 allocates the as many searching ranges as the parallel number to the as many area optimization performing units as the parallel number $104_1$ to $104_N$. The optimization performing unit 103 performs the next processing in parallel by the area optimization performing units $104_1$ to $104_N$.

Each of the area optimization performing units $104_1$ to $104_N$ repeats a predetermined number of times, in the allocated searching range, inputting to a simulator the parameter selected from the searching range and input data obtained from the transformation matrix, and acquiring the objective function value that is difference between output data and a previously provided observation.

In addition, each of the area optimization performing units $104_1$ to $104_N$ approximates a function representing the relationship between input data and the objective function value by the Gaussian process. Then, each of the area optimization performing units $104_1$ to $104_N$; determines a next input parameter using the approximated function and an acquisition function that uses the parameter providing the optimum objective function value. Then, each of the area optimization performing units $104_1$ to $104_N$ repeats a predetermined number of times, inputting to a simulator the determined next input parameter and input data obtained from the transformation matrix, and determining the objective function value.

Figure 3:
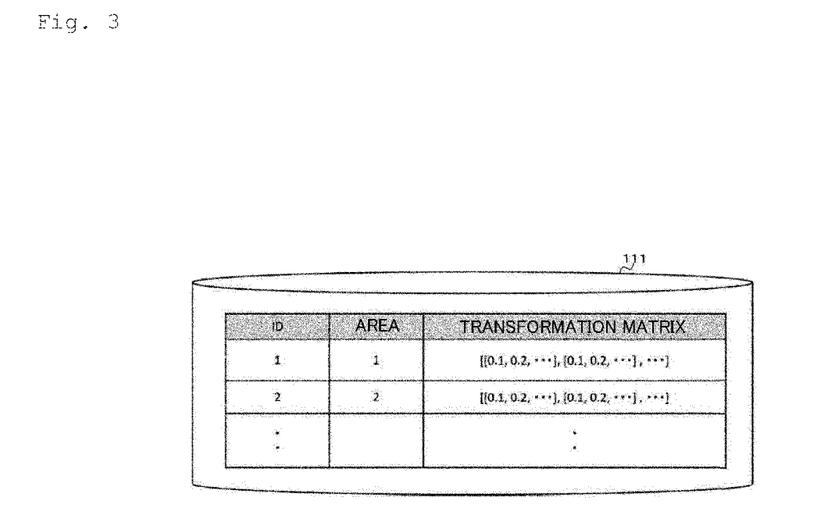
FIG. 3 illustrates an example of a searching range DB that has data recorded in a database table.

The searching range DB 111 is a database that records an ID, an area, and the transformation matrix. FIG. 3 shows an example of the searching range DB 111 that has data recorded in a database table.

Figure 4:
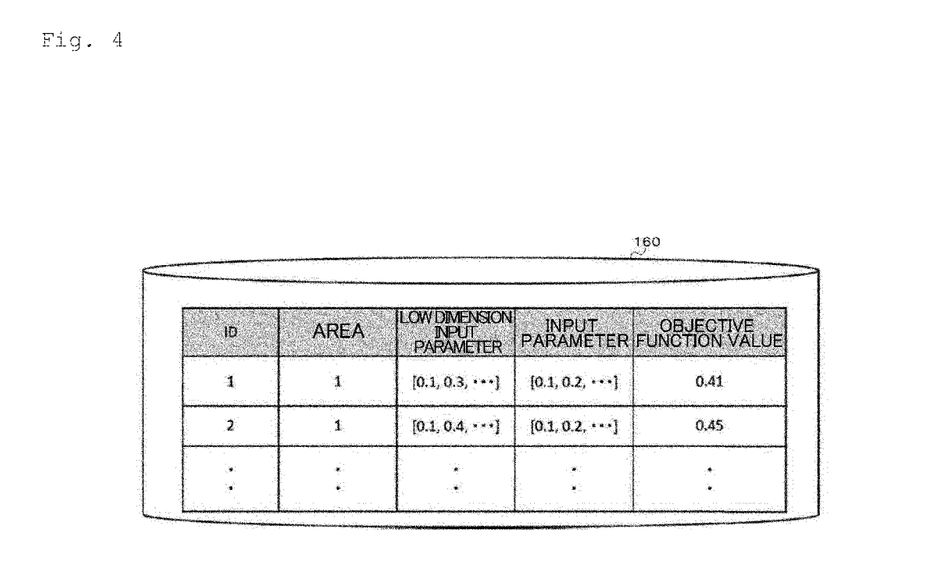
FIG. 4 illustrates an example of an optimization DB that has data recorded in a database table.

The optimization DB 160 is a database that records an ID, an area indicating the searching range, a low dimension input parameter, an input parameter, and the objective function value. FIG. 4 shows an example of the optimization DB 160 that has data recorded in a database table.

Figure 5:
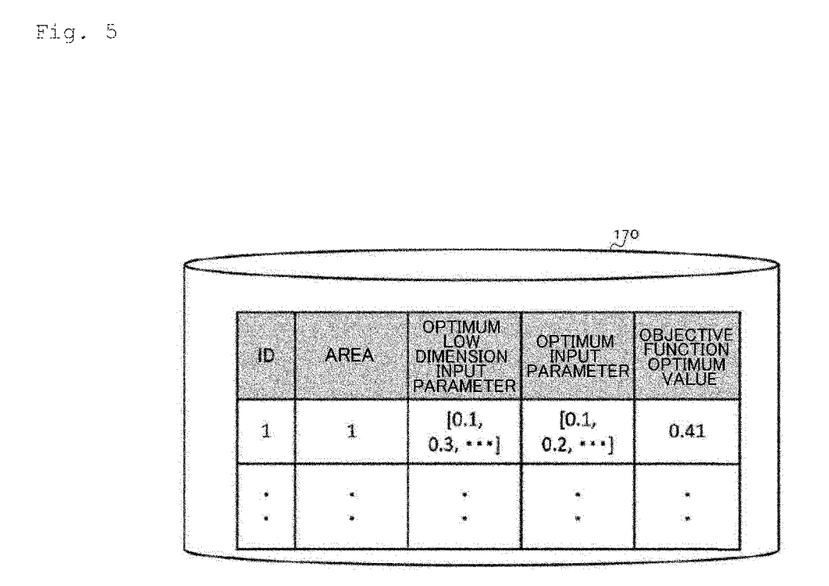
FIG. 5 illustrates an example of an area-by-area optimum value DB that has data recorded in a database table.

The area-by-area optimum value DB 170 is a database that records an ID, an area indicating the searching range, an optimum low dimension input parameter, an optimum input parameter, and the objective function optimum value. FIG. 5 shows an example of the area-by-area optimum value DB 170 that has data recorded in a database table.

The optimum value determination unit 106 determines the optimum input parameter obtained from the parameter and transformation matrix that provide the optimum objective function value according to the objective function values determined for the respective searching ranges.

The determination unit 107 repeats as one cycle the processes by the searching range determination unit 102, the optimization performing unit 103, and the optimum value determination unit 106. In repeating the cycle, the searching range determination unit 102 prioritizes the searching range that includes the optimum input parameter determined in the previous cycle and determines as many searching ranges as the parallel number.

<Acts of Parameter Estimation System According to Embodiment of Present Invention>

Figure 6:
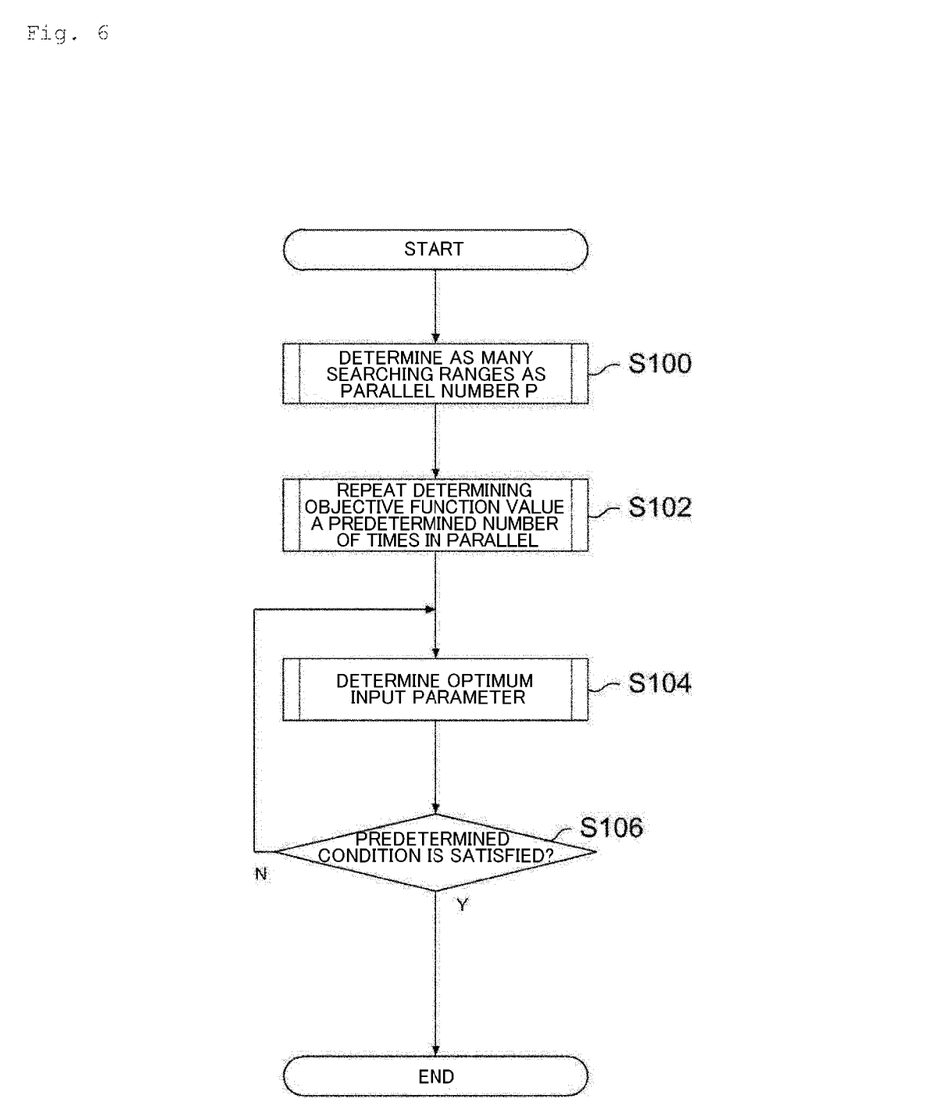
FIG. 6 is a flowchart showing a processing routine in the parameter estimation system according to the embodiment of the present invention.

Acts of the parameter estimation system 100 according to the embodiment of the present invention will now be described. FIG. 6 is a flowchart illustrating a processing routine of the parameter estimation system 100 according to the embodiment of the present invention. The parameter estimation system 100 performs the processing routine shown in FIG. 6.

In S100, the searching range determination unit 102 determines, according to the input data dimension number D that is a dimension number of input data, the reduced dimension number d lower than the input data dimension number, and the parallel number P, as many transformation matrices as the parallel number P, and thus determines as many searching ranges as the parallel number P. Here, the transformation matrix is a transformation matrix for transforming a space defined by the input data dimension number to a space defined by the reduced dimension number d.

In S102, the optimization performing unit 103 allocates the as many searching ranges as the parallel number to the area optimization performing units $104_1$ to $104_N$, and the area optimization performing units $104_1$ to $104_N$ perform the next processing in parallel. Each of the area optimization performing units $104_1$ to $104_N$ repeats a predetermined number of times, in the allocated searching range, inputting to a simulator the parameter selected from the searching range and input data obtained from the transformation matrix, and acquiring the objective function value that is difference between output data and a previously provided observation. Each of the area optimization performing units $104_1$ to $104_N$ approximates a function representing the relationship between input data and the objective function value by the Gaussian process. Then, each of the area optimization performing units $104_1$ to $104_N$ determines a next input parameter using the approximated function and an acquisition function that uses the parameter providing the optimum objective function value. Then, each of the area optimization performing units $104_1$ to $104_N$ repeats a predetermined number of times, inputting to a simulator the determined next input parameter and input data obtained from the transformation matrix, and determining the objective function value.

In S104, the optimum value determination unit 106 determines the optimum input parameter obtained from the parameter and transformation matrix that provide the optimum objective function value according to the objective function values determined for the respective searching ranges.

In S106, the determination unit 107 determines if a predetermined condition is satisfied. If the condition is satisfied, then the processing is ended. If the condition is not satisfied, then the control returns to S100 to perform the processing in the next cycle. The predetermined condition may be whether it is repeated a predetermined number of cycles or the like. As described above, the processes by the searching range determination unit 102, the optimization performing unit 103, and the optimum value determination unit 106 in S100 to S104 are repeated as one cycle.

Figure 7:
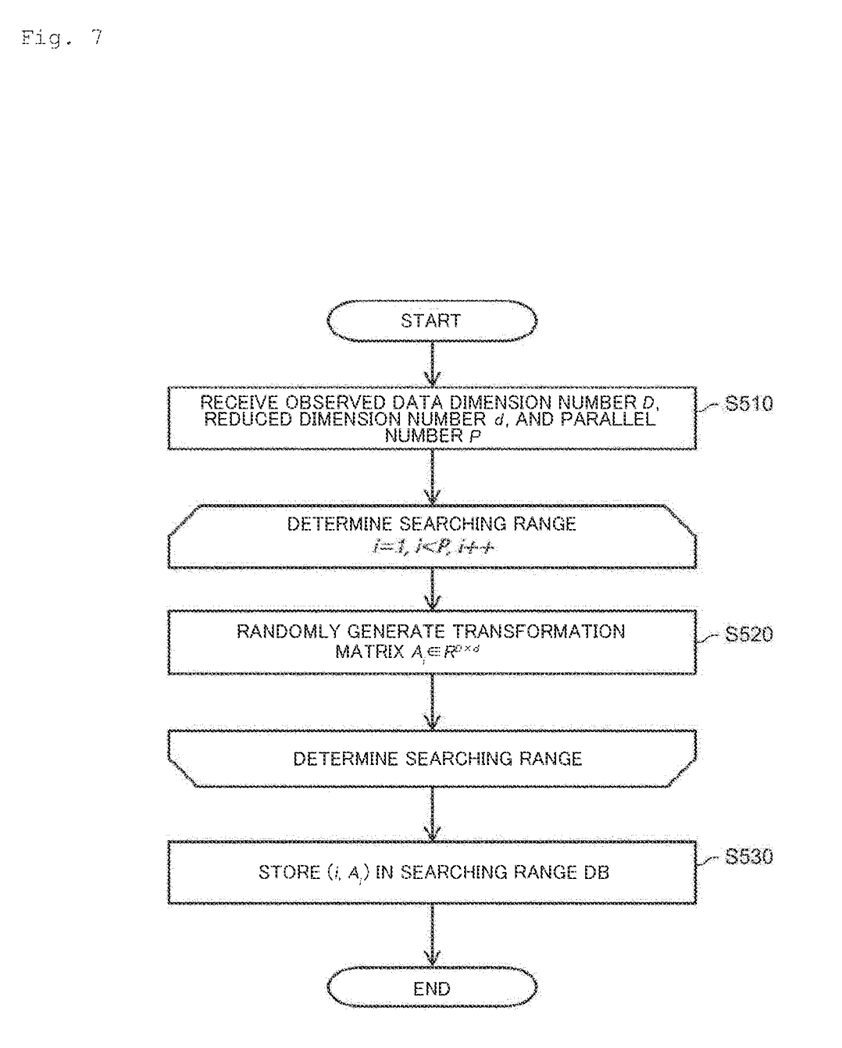
FIG. 7 is a flowchart showing a processing routine in a searching range determination unit.

The processing of the searching range determination unit 102 in S100 will now be described. FIG. 7 is a flowchart showing the processing routine of the searching range determination unit 102.

In S510, the searching range determination processing unit 110 receives from the user the input data dimension number D (the observed data dimension number D), the reduced dimension number d, and the parallel number P.

The processing step in S520 is counted up from i=0 such that i=i+1 for every performance and repeated the parallel number P under the condition of i<P.

In S520, the searching range determination processing unit 110 generates the searching ranges of the specified parallel number P. The searching range is for example an area transformed to a lower dimension by the method of NPL 3. It is repeated for every i. Specifically, the transformation matrix $A_i \in R^{D \times d}$ is generated as area information for transforming to the lower dimension. The transformation matrix A may be generated by generating its elements probabilistically using any probability distribution such as the normal distribution and the uniform distribution, etc.

In S530, the searching range determination processing unit 110 stores information (i, $A_i$) about the generated searching range in the searching range DB 111.

Figure 8:
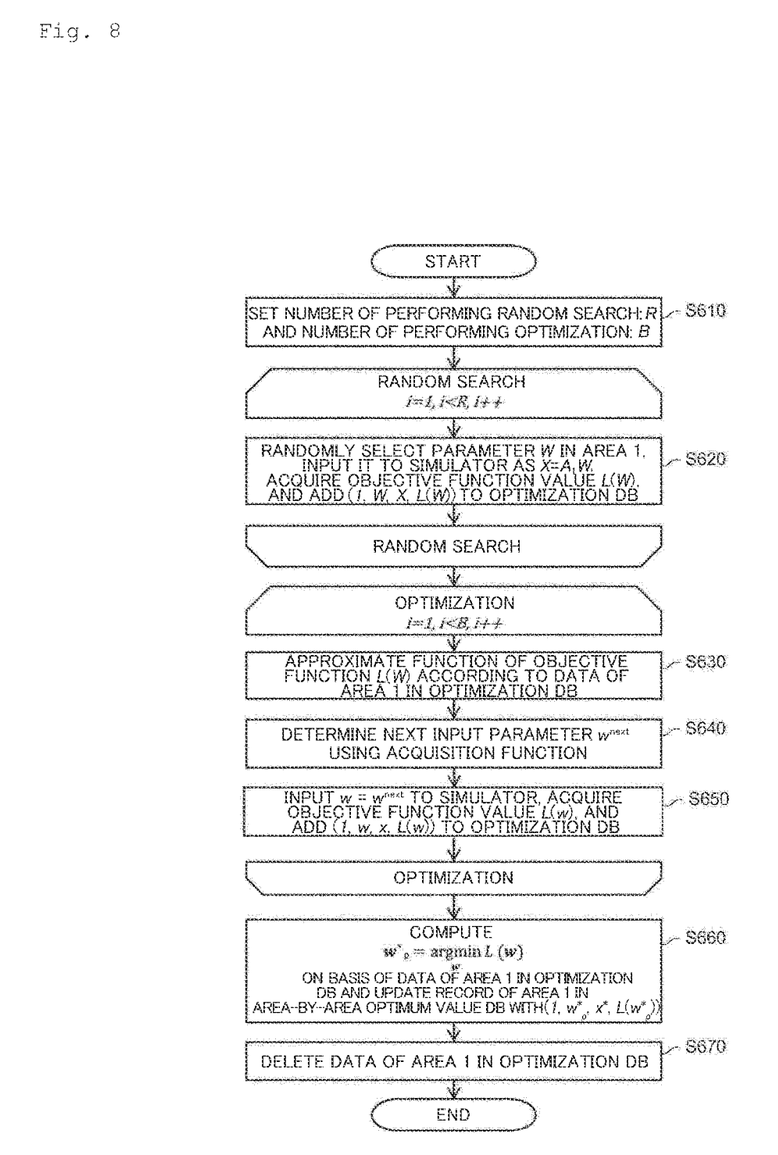
FIG. 8 is a flowchart showing a processing routine in an optimization performing unit.

The processing of the optimization performing unit 103 in S102 will now be described. FIG. 8 is a flowchart showing the processing routine of the optimization performing unit 103. The optimization performing unit 103 allocates the searching ranges generated in S100 to the area optimization performing units 104₁ to 104_N. This embodiment will be described with respect to an example of N=2. The processing routine in FIG. 8 is performed in parallel by the area optimization performing units 104₁ to 104₁. In addition, as the optimization technique, Bayesian optimization, etc. may be used for example. In this embodiment, an example of using Bayesian optimization will be described. Although a description will be given below of an example in which the area optimization performing unit 104₁ processes, the same holds true for an example in which the area optimization performing unit 104_N processes.

In S610, the area optimization performing unit 104₁ sets the number of performing random search as R and the number of performing optimization as B. The values of R and B may be ones previously stored in the storage unit 53 etc. or ones input by the user.

The processing step in S620 is counted up from i=0 such that i=i+1 for every performance and repeated the number R of performing random search under the condition of i<R.

In S620, the area optimization performing unit 104₁ randomly selects a parameter w in the area 1 indicating the searching range, inputs the parameter to a simulator as x=A₁w, and acquires the objective function value L(w). Then, (1, w, x, L(w)) is added to the optimization DB 160.

The following processing steps in S630 to S650 are counted up from i=0 such that i=i+1 for every performance and repeated the number B of performing optimization under the condition of i<B.

In S630, the area optimization performing unit 104₁ approximates a function f representing the relationship between the parameter w and the objective function $L(w)_n$ by the Gaussian process according to data of the area 1 indicating the searching range in the optimization DB 160. Here, if the function f follows the Gaussian process, any subset follows the following Gaussian distribution.

$$P(f) = N(f|0, K_{nn})$$

Note, however, that $K_{nn}$ is a variance-covariance matrix of n×n and (d, d') element $k_{dd'}$ of the variance-covariance matrix is represented as $k(w_d, w'_d)$ using the kernel function $k(\bullet, \bullet)$.

Then, given y=L(w), the posterior probability of an output variable y* of an unknown input variable w* is given by the Gaussian distribution in formula (3) below.

[Formula 3]

$$P(y_* | y) = N(y_* | m(w_*), C(w_*, w_*)), \quad (3)$$
$$m(w) = k_w^T C_{nn}^{-1} y, \quad C(w, w') = k(w, w') - k_w^T C_{nn}^{-1} k_w$$

Note, however, that it is defined that $C_{nn} = K_{nn} + \sigma^2 I_n$, and $I_n$ represents an identity matrix of n×n. Thus, formula (3) may be used for prediction.

In S640, the area optimization performing unit 104₁ follows formula (4) below and determines the next observation subject parameter $w^{next}$ that is highly likely to satisfy formula (2). In that case, the $w^{next}$ may not be one and a plurality of $w^{next}$ may be selected in descending order of probability.

[Formula 4]

$$w^{next} = \underset{w}{\arg\min}\, \alpha(w) \quad (4)$$

Here, α is called an acquisition function and several functions have been proposed (NPL 1). For example, when using Expected Improvement (EI), the acquisition function may be computed using formula (5) below.

[Formula 5]

$$\alpha(w) = (\mu(w) - \tau)\Phi(\gamma(w)) + \sigma(w)\phi(\gamma(w)), \quad (5)$$
$$\gamma(w) = \frac{\mu(w) - \tau}{\sigma(w)}$$

Here, μ is the average, σ is the standard deviation, and Φ and φ are CDF and PDF of the standard normal distribution, which are derived using the function f approximated by the Gaussian process in S630.

τ is the past optimum parameter $w_{best}$, which is acquired from past data in the searching range.

In S650, the area optimization performing unit 104₁ inputs to a simulator the input parameter x that is determined by multiplying $w = w^{next}$ by A, and acquires the objective function value L(w). $w^{next}$ is the next input parameter determined using the acquisition function. Then, (l, w, x, L(w)) is added to the optimization DB 160.

In S660, the area optimization performing unit 104₁ computes $w'_p$ according to the following formula on the basis of data of the area 1 indicating the searching range in the optimization DB 160, and updates the record of the area 1 in the area-by-area optimum value DB 170 with (l, $w^*_p$, x, L(w*p)).

$$w^*_p = \underset{w}{\arg\min}\, L(w)$$

In S670, the area optimization performing unit 104₁ deletes data of the area 1 in the optimization DB 160.

Figure 9:
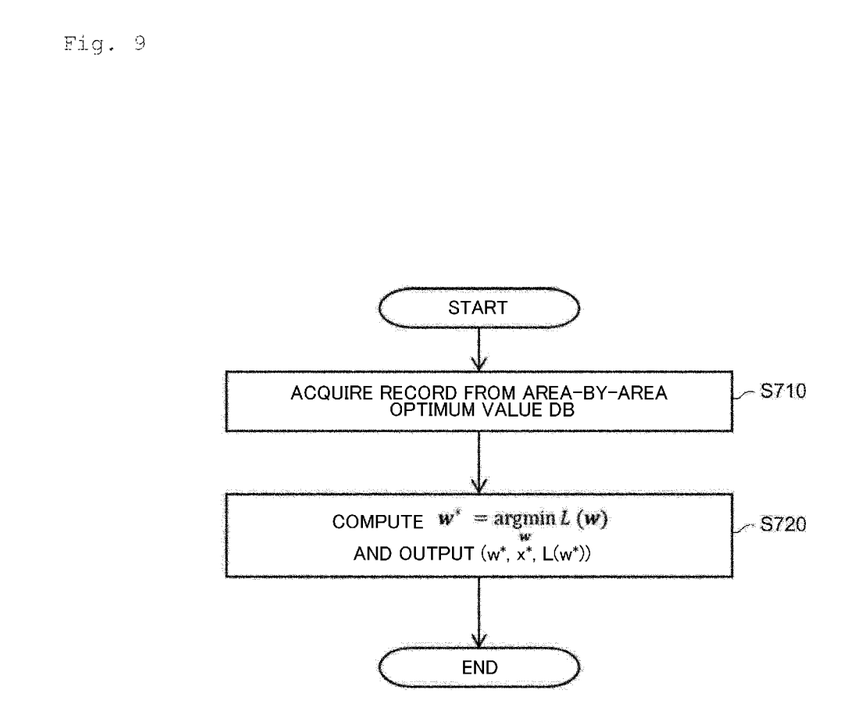
FIG. 9 is a flowchart showing a processing routine in an optimum value determination unit.

The processing of the optimum value determination unit 106 in S104 will now be described. FIG. 9 is a flowchart showing the processing routine of the optimum value determination unit 106.

In S710, the optimum value determination unit 106 acquires the records from the table in the area-by-area optimum value DB 170.

In S720, the optimum value determination unit 106 computes w* according to the following formula and outputs a record (w*, x*, L(w)) including the optimum input parameter x*.

$$w^* = \underset{w}{\arg\min}\, L(w)$$

When the determination unit 107 repeats a plurality of cycles, the searching range determination processing unit 110 may preferentially use the searching range including the optimum value computed in the previous cycle. This may be provided by improving the method of generating the transformation matrix A or changing the definition of the objective function. When changing the definition of the objecfunction, if it is known that there are optimum points around a certain point $x_{prior}$, for example, the objective function is defined as $L(w)=G(Aw+x_{prior})$. By defining the objective function as described above, the optimization in a plane through points determined by L(w) can be considered. As described above, in the repeating by the determination unit 107, the objective function in the next cycle may be defined such that the searching range including the optimum input $x_{prior}$ parameter determined in the previous cycle is preferentially used.

As described above, the parameter estimation system according to the embodiment of the present invention determines as many searching ranges as the parallel number P. For as many searching ranges as the parallel number, determination of the objective function value is repeated a predetermined number of times in parallel. Bayesian optimization may thus be speeded up.

In addition, the searching range is divided into smaller ranges, thus speeding up Bayesian optimization. In addition, the processing of dividing the searching range by reducing the dimension may provide the processing of excluding the unavailable observation information. In addition, the division of the searching range in an easy way may prevent the time required for division from becoming relatively large even if moderate time is required for the optimization. In addition, the division of the searching range may enable the high dimensional parameter search and the parameter search in a wide searching range to which it is difficult to adapt Bayesian optimization. In addition, if the searching range is divided by reducing the dimension, the space of reduced dimension may be searched in parallel and in a plurality of cycles to select an arbitrary integer of $1 \leq d < D$ as the reduced dimension number d, thus making it possible to search the optimum solution at an even lower dimension.

Note that the present invention is not limited to the above embodiment and various modifications and applications may be made without departing from the spirit of the present invention.

For example, the technique may be applied to the black box optimization techniques other than Bayesian optimization. For example, it is contemplated that the technique may adapt to genetic algorithm (GA) and evolution strategy (ES) or the like.

Although the above embodiment has been described with respect to an example in which the Gaussian process approximation is used in Bayesian optimization, an approximation technique using a different probabilistic model such as random forests may be used.

Although the above embodiment has been described with respect to an example in which, when applied to Bayesian optimization, a predetermined device is used as a simulator and the input parameter is input to the simulator to obtain the objective function value, the input parameter may be input to predetermined devices corresponding to the respective optimization techniques to acquire the objective function value.

REFERENCE SIGNS LIST

100 Parameter estimation system
102 Searching range determination unit
103 Optimization performing unit
$104_1$ to $104_N$ Area optimization performing unit
106 Optimum value determination unit
107 Determination unit
110 Searching range determination processing unit

The invention claimed is:

1. A parameter estimation system comprising:
a searching range determiner configured to determine, according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number, and thus determines as many searching ranges as the parallel number;
an optimization performer configured to repeat a predetermined number of times, for the as many searching ranges as the parallel number, in the searching range, inputting a parameter selected from the searching range and input data obtained from the transformation matrix to a predetermined device that outputs an objective function value about a previously provided observation, and acquiring the objective function value, and repeats in parallel, wherein a parallel processing is iteratively performed on each of a plurality of subspaces in the space, a predetermined number of times, determining the objective function value obtained from the parameter wherein the parameter represents a search range with reduced dimension, and the transformation matrix that provide the optimum objective function value; and
an optimum value determiner configured to, on the basis of the objective function values determined for the respective searching ranges, determine an optimum input parameter obtained from the parameter and the transformation matrix that provide the optimum objective function value.

2. The parameter estimation system according to claim 1, wherein the optimization performer, for the as many searching ranges as the parallel number, after acquiring the objective function value, repeats in parallel, a predetermined number of times, approximating a function representing a relationship between the objective function value and input data using a probabilistic model, determining a next input parameter using the approximated function and an acquisition function that uses the parameter providing the optimum objective function value, inputting the determined next input parameter and input data obtained from the transformation matrix to the predetermined device, and determining the objective function value.

3. The parameter estimation system according to claim 2, wherein the optimization performer, for the as many searching ranges as the parallel number, repeats a predetermined number of times, in the searching range, inputting to a simulator a parameter selected from the searching range and input data obtained from the transformation matrix and acquiring output data and the objective function value, and repeats in parallel, a predetermined number of times, determining a next input parameter using the acquisition function, inputting to the simulator the determined next input parameter and input data obtained from the transformation matrix, and determining the objective function value.

4. The parameter estimation system according to claim 1, further comprising a determiner, the determiner repeating as one cycle the processes by the searching range determiner, the optimization performer, and the optimum value determiner.

5. The parameter estimation system according to claim 4, wherein in the repeating, the searching range determiner prioritizes the searching range that comprises the optimum input parameter determined in a previous cycle in determining as many searching ranges as the parallel number.

6. A parameter estimation method, comprising:
   determining, by a searching range determiner, according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number and, thus determining as many searching ranges as the parallel number;
   repeating a predetermined number of times, by an optimization performer, for the as many searching ranges as the parallel number, in the searching range, inputting a parameter selected from the searching range and input data obtained from the transformation matrix to a predetermined device that outputs an objective function value about a previously provided observation, and acquiring the objective function value, and repeating in parallel, wherein a parallel processing is iteratively performed on each of a plurality of subspaces in the space, a predetermined number of times, determining the objective function value obtained from the parameter wherein the parameter represents a search range with reduced dimension, and the transformation matrix that provide the optimum objective function value; and
   determining, by an optimum value determiner, on the basis of the objective function values determined for the respective searching ranges, an optimum input parameter obtained from the parameter and the transformation matrix that provide the optimum objective function value.

7. A computer-readable non-transitory recording medium storing computer-executable program instructions that when executed by a processor cause a computer system to execute:
   determining, by a search range determiner according to an input data dimension number that is a dimension number of input data, a reduced dimension number that is lower than the input data dimension number, and a parallel number, as many transformation matrices as the parallel number, each transformation matrix being for transforming a space defined by the input data dimension number to a space defined by the reduced dimension number, and thus determine as many searching ranges as the parallel number;
   repeating, by an optimization performer, a predetermined number of times, for the as many searching ranges as the parallel number, in the searching range, inputting a parameter selected from the searching range and input data obtained from the transformation matrix to a predetermined device that outputs an objective function value about a previously provided observation, and acquiring the objective function value, and repeating in parallel, wherein a parallel processing is iteratively performed on each of a plurality of subspaces in the space, a predetermined number of times, determining the objective function value obtained from the parameter wherein the parameter represents a search range with reduced dimension, and the transformation matrix that provide the optimum objective function value; and
   determining, by an optimum value determiner, on the basis of the objective function values determined for the respective searching ranges, an optimum input parameter obtained from the parameter and the transformation matrix that provide the optimum objective function value.

8. The parameter estimation system according to claim 2, further comprising a determiner, the determiner repeating as one cycle the processes by the searching range determiner, the optimization performer, and the optimum value determiner.

9. The parameter estimation system according to claim 3, further comprising a determiner, the determiner repeating as one cycle the processes by the searching range determiner, the optimization performer, and the optimum value determiner.

10. The parameter estimation method according to claim 6, wherein the optimization performer, for the as many searching ranges as the parallel number, after acquiring the objective function value, repeats in parallel, a predetermined number of times, approximating a function representing a relationship between the objective function value and input data using a probabilistic model, determining a next input parameter using the approximated function and an acquisition function that uses the parameter providing the optimum objective function value, inputting the determined next input parameter and input data obtained from the transformation matrix to the predetermined device, and determining the objective function value.

11. The parameter estimation method according to claim 6, further comprising:
    repeating, by a determiner, as one cycle the processes by the searching range determiner, the optimization performer, and the optimum value determiner.

12. The parameter estimation method according to claim 10, further comprising:
    repeating, by a determiner, as one cycle the processes by the searching range determiner, the optimization performer, and the optimum value determiner.

13. The parameter estimation method according to claim 10, wherein the optimization performer, for the as many searching ranges as the parallel number, repeats a predetermined number of times, in the searching range, inputting to a simulator a parameter selected from the searching range and input data obtained from the transformation matrix and acquiring output data and the objective function value, and repeats in parallel, a predetermined number of times, determining a next input parameter using the acquisition function, inputting to the simulator the determined next input parameter and input data obtained from the transformation matrix, and determining the objective function value.

14. The parameter estimation method according to claim 13, further comprising:
    repeating, by a determiner, as one cycle the processes by the searching range determiner, the optimization performer, and the optimum value determiner.

15. The parameter estimation method according to claim 14, wherein in the repeating, the searching range determiner prioritizes the searching range that comprises the optimum input parameter determined in a previous cycle in determining as many searching ranges as the parallel number.

16. The computer-readable non-transitory recording medium of claim 7, wherein the optimization performer, for the as many searching ranges as the parallel number, after acquiring the objective function value, repeats in parallel, a predetermined number of times, approximating a function representing a relationship between the objective function value and input data using a probabilistic model, determining a next input parameter using the approximated function and an acquisition function that uses the parameter providing the optimum objective function value, inputting the determined next input parameter and input data obtained from the transformation matrix to the predetermined device, and determining the objective function value.

17. The computer-readable non-transitory recording medium of claim 7, the computer-executable instructions when executed further causing the computer system to:
repeat, by a determiner, as one cycle the processes by the searching range determiner, the optimization performer, and the optimum value determiner.

18. The computer-readable non-transitory recording medium of claim 16,
the computer-executable instructions when executed further causing the computer system to:
repeat, by a determiner, as one cycle the processes by the searching range determiner, the optimization performer, and the optimum value determiner.

19. The computer-readable non-transitory recording medium of claim 16, wherein the optimization performer, for the as many searching ranges as the parallel number, repeats a predetermined number of times, in the searching range, inputting to a simulator a parameter selected from the searching range and input data obtained from the transformation matrix and acquiring output data and the objective function value, and repeats in parallel, a predetermined number of times, determining a next input parameter using the acquisition function, inputting to the simulator the determined next input parameter and input data obtained from the transformation matrix, and determining the objective function value.

20. The computer-readable non-transitory recording medium of claim 19, the computer-executable instructions when executed further causing the computer system to:
repeat, by a determiner, as one cycle the processes by the searching range determiner, the optimization performer, and the optimum value determiner, wherein in the repeating, the searching range determiner prioritizes the searching range that comprises the optimum input parameter determined in a previous cycle in determining as many searching ranges as the parallel number.

* * * * *